(12) United States Patent
Scherer et al.

(10) Patent No.: US 8,839,612 B2
(45) Date of Patent: Sep. 23, 2014

(54) METHOD FOR OPERATING AN EXHAUST SYSTEM OF AN INTERNAL COMBUSTION ENGINE

(75) Inventors: Stefan Scherer, Stuttgart (DE); Markus Gloeckle, Stuttgart (DE); Tobias Pfister, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 143 days.

(21) Appl. No.: 13/403,658

(22) Filed: Feb. 23, 2012

(65) Prior Publication Data

US 2012/0222401 A1 Sep. 6, 2012

(30) Foreign Application Priority Data

Feb. 23, 2011 (DE) .......................... 10 2011 004 557

(51) Int. Cl.
*F01N 3/00* (2006.01)
*F01N 3/10* (2006.01)
*F01N 3/20* (2006.01)
*F01N 11/00* (2006.01)
*F01N 3/08* (2006.01)
*F02D 41/02* (2006.01)
*F01N 13/02* (2010.01)

(52) U.S. Cl.
CPC .............. *F01N 3/2066* (2013.01); *F01N 3/106* (2013.01); *F01N 13/02* (2013.01); *F01N 11/00* (2013.01); *F01N 3/0842* (2013.01); *Y02T 10/47* (2013.01); *F01N 2560/14* (2013.01); *Y02T 10/24* (2013.01); *F01N 2550/02* (2013.01); *F02D 41/0275* (2013.01); *F01N 2560/026* (2013.01)
USPC .......................................................... 60/301

(58) Field of Classification Search
USPC ............ 60/274, 276, 277, 286, 297, 301, 303
See application file for complete search history.

(56) References Cited

U.S. PATENT DOCUMENTS

| | | | | |
|---|---|---|---|---|
| 7,134,273 | B2 * | 11/2006 | Mazur et al. | 60/286 |
| 7,650,746 | B2 * | 1/2010 | Hu et al. | 60/286 |
| 7,685,813 | B2 * | 3/2010 | McCarthy, Jr. | 60/295 |
| 7,892,508 | B2 * | 2/2011 | Katoh | 423/213.2 |
| 8,091,416 | B2 * | 1/2012 | Wang et al. | 73/114.75 |
| 8,122,712 | B2 * | 2/2012 | Ren et al. | 60/299 |
| 8,196,391 | B2 * | 6/2012 | Theis | 60/286 |
| 8,347,604 | B2 * | 1/2013 | Hagimoto et al. | 60/277 |
| 8,418,438 | B2 * | 4/2013 | Shimomura et al. | 60/277 |
| 8,516,798 | B2 * | 8/2013 | Dobson et al. | 60/286 |
| 2010/0326051 | A1 | 12/2010 | Busch et al. | |
| 2012/0227383 | A1 * | 9/2012 | Charial et al. | 60/274 |

FOREIGN PATENT DOCUMENTS

DE 102010028846 11/2011

* cited by examiner

*Primary Examiner* — Binh Q Tran
(74) *Attorney, Agent, or Firm* — Michael Best & Friedrich LLP

(57) ABSTRACT

A method for operating an exhaust system of an internal combustion engine, wherein nitrogen oxide ($NO_x$) is reduced by use of a SCR catalytic converter and wherein the ageing state of the SCR catalytic converter is monitored, characterized in that during a temporally limited phase having a high proportion of nitrogen oxide ($NO_x$) in the exhaust gas, a conversion of said SCR catalytic converter is acquired and evaluated and the ageing state of said SCR catalytic converter is suggested therefrom.

10 Claims, 2 Drawing Sheets

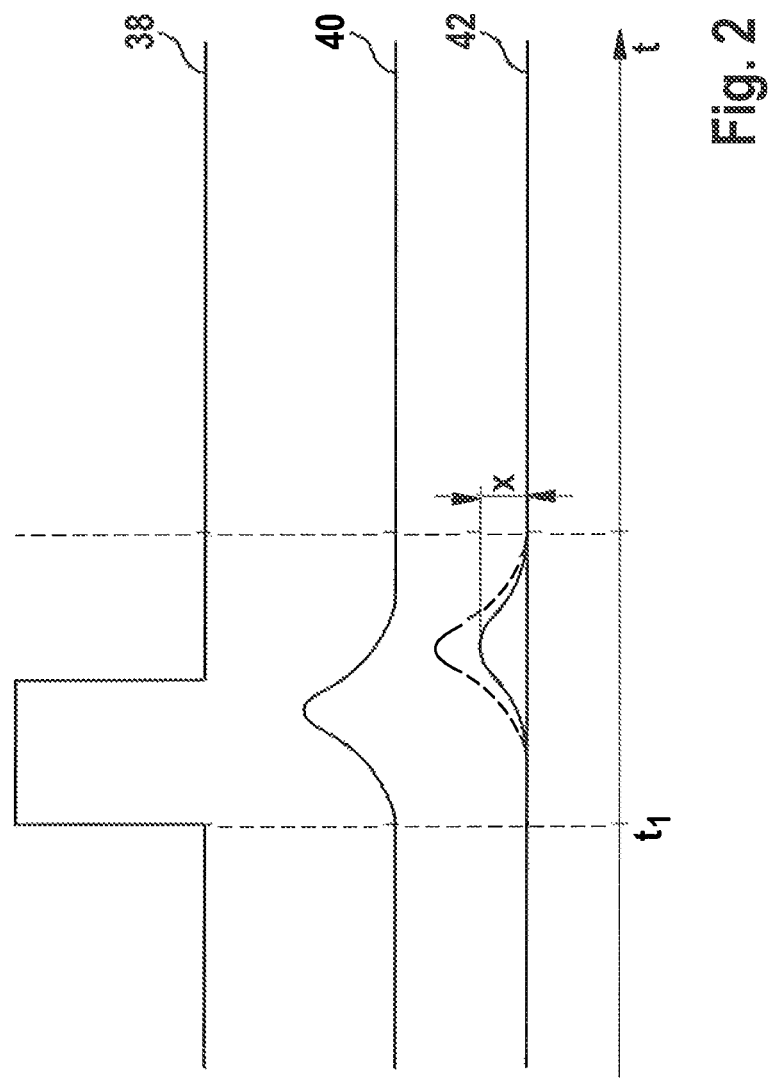

METHOD FOR OPERATING AN EXHAUST SYSTEM OF AN INTERNAL COMBUSTION ENGINE

BACKGROUND OF THE INVENTION

The invention relates to a method for operating an exhaust system of an internal combustion engine, wherein nitrogen oxide ($NO_x$) is reduced by the use of a SCR catalytic converter, and wherein the ageing state of the SCR catalytic converter is monitored, as well as to a computer program and an open-loop and/or closed-loop control device for use in such a method.

Exhaust systems in motor vehicles are known from prior art, which are equipped with different devices for the after-treatment of exhaust gas in order to meet existing statutory requirements. The functional capability of such devices must be monitored with on-board means during an operation of the motor vehicle. Within the scope of a so-called "on-board diagnosis" (OBD), it can, for example, be necessary to monitor an SCR catalytic converter (Selective Catalytic Reduction) and if need be to recognize said catalytic converter as being defective.

The basic principle of the SCR catalytic converter is that nitrogen oxide molecules ($NO_x$) are reduced on a catalyst surface in the presence of ammonia ($NH_3$) as the reducing agent to elementary nitrogen. The reducing agent is allocated by a dosing device upstream of the SCR catalytic converter. The determination of the desired dosing rate takes place in an electronic open-loop and/or closed-loop control device, in which methods for the operation and the monitoring of the SCR catalytic converter are deposited.

The monitoring of an SCR catalytic converter can take place using at least one $NO_x$ sensor. $NO_x$ sensors currently available on the market exhibit a cross-sensitivity to ammonia ($NH_3$). That means a sensor signal of the $NO_x$ sensor does not exclusively indicate the respective $NO_x$ concentration but rather a summed signal of the $NO_x$ and the $NH_3$ concentration. In the case of a $NO_x$ sensor that is disposed downstream of the SCR catalytic converter, an increase of the sensor signal can, for example, indicate a decreasing $NO_x$ conversion rate (increase in the $NO_x$ concentration) as well as a breakthrough of pure ammonia (increase in the $NH_3$ concentration). A direct distinction between $NO_x$ and $NH_3$ is therefore not possible.

The incidence of pure ammonia downstream of the SCR catalytic converter (so-called $NH_3$ slippage) should be prevented because ammonia in high concentration has a harmful effect on health.

Monitoring functions currently known on the market ascertain the efficiency of a $NO_x$ reduction ($NO_x$ conversion rate) with the aid of each $NO_x$ sensor upstream and downstream of the SCR catalytic converter. The SCR catalytic converter disposed upstream can thereby also be replaced by a model-based characteristic value. Due to the ageing of the SCR catalytic converter, the achievable conversion rate decreases with increasing operating time, and the $NO_x$ emissions downstream of said SCR catalytic converter increase accordingly. Based on predetermined limit values for admissible $NO_x$ emissions, a threshold value for the SCR efficiency can be determined. If said threshold value is undershot, a system error in the exhaust system is then suggested. The accuracy of this method is however limited by the insufficient accuracy of the available $NO_x$ sensors and cannot in many cases meet the standards of the statutory laws.

The German patent specification DE 10 2007 040 439 A1 describes a monitoring strategy for an SCR catalytic converter, in which a $NH_3$ storage capacity of the SCR catalytic converter is ascertained. It was in fact discovered that the capability of the catalytic converter to adsorb $NH_3$ can be used as a characteristic or indicator for the ageing of or the damage to said catalytic converter. When using this strategy, the SCR catalytic converter is initially filled with reducing agent up to the maximally achievable $NH_3$ storage capacity by means of a superstoichiometric reducing agent dosing. In so doing, a defined starting point for a diagnosis is attained. The attainment of the maximum storage capacity is detected on the basis of a breakthrough of ammonia ($NH_3$ slippage) through the catalytic converter. The $NH_3$ slippage can be indirectly measured on account of the aforementioned cross-sensitivity of the $NO_x$ sensor to $NH_3$.

The dosing of the reducing agent is subsequently reduced in relation to a normal dosing or is entirely turned off; thus enabling the stored $NH_3$ mass to gradually be depleted again by means of the $NO_x$ reduction (so-called emptying test). By determining the SCR efficiency or other characteristic values dependent on the $NO_x$ conversion rate during the emptying test, the useable $NO_x$ storage capacity of the SCR catalytic converter can be indirectly determined, because with a lower stored $NH_3$ mass, less $NO_x$ can be converted on the catalytic converter surface.

The disadvantage of this method is the long time period required for discharging the $NH_3$ storage. In particular in the case of future exhaust gas after-treatment systems, in which a $NO_x$ storage catalytic converter is installed close to the engine for the purpose of further lowering the $NO_x$ emissions even when cold starting said engine, the $NO_x$ concentration can be so low upstream of the SCR catalytic converter that the time required for discharging the $NH_3$ storage becomes too long, and this method can therefore no longer be used.

SUMMARY OF THE INVENTION

The problem underlying the invention is solved by a method according to claim 1 as well as by an open-loop and/or closed-loop control device and a computer program according to the additional independent claims. Advantageous modifications to the invention are specified in the dependent claims. Important features for the invention can further be found in the following description and in the drawings, wherein the features can be important for the invention in isolation as well as in different combinations without having to explicitly point this fact out again.

The method according to the invention has the advantage that the ageing state of a SCR catalytic converter in an exhaust system of an internal combustion engine, especially that of an upstream $NO_x$ storage catalytic converter, can be diagnosed in a considerably shorter time than is possible with a previously described emptying test.

According to the invention, use is made of the fact that a ratio of $NO_2$ to $NO_x$ of 1:1 must be present in the exhaust gas for the optimal operation of the SCR catalytic converter; however on the other hand, the capacity of the SCR catalytic converter to achieve a high conversion of $NO_x$ to nitrogen (conversion rate) even at unfavorable $NO_2/NO_x$ ratios is an important measurement for the state thereof.

Because considerably more $NO_x$ than $NO_2$ is contained in the exhaust gas of an internal combustion engine, catalytically coated, oxidizing exhaust gas after-treatment components disposed upstream of the SCR catalytic converter as, for example, oxidation catalytic converters or catalytically coated particle filters take over the task of oxidizing $NO_x$ to $NO_2$ and thus of producing a $NO_2/NO_x$ ratio favorable for the SCR conversion rate. The SCR catalytic converter works especially effectively if a $NO_x$ storage catalytic converter is upstream thereof. Said $NO_x$ storage catalytic converter stores the accumulating nitrogen oxides ($NO_x$), for example, during a cold start when the oxidizing exhaust gas after-treatment components have not yet reached the operating temperature thereof. Said $NO_x$ storage catalytic converter is regenerated by the air-fuel mixture being enriched ($\lambda$<1). In so doing, $NO_x$ stored in said $NO_x$ storage catalytic converter is partially desorbed within the framework of a suitable process management. Said $NO_x$ does not however oxidize to $NO_2$ on account of the small proportion of oxygen and the low temperature (<300° C.). A temporally limited increase in the $NO_x$ concentration is thereby produced downstream of said $NO_x$ storage catalytic converter. At such a so-called desorption peak, it comes in combination with low temperatures in said $NO_x$ storage catalytic converter, even at $\lambda$ values <1, to the point where oxygen leaves said $NO_x$ storage catalytic converter, or respectively where oxygen stored in the SCR catalytic converter during preceding operating states with $\lambda$ values >1 is sufficient, in order to facilitate a $NO_x$ conversion in the SCR catalytic converter according to the following reaction equation:

Because a conversion of $NO_x$ according to the above reaction equation sharply drops at low $\lambda$ values even with only slight damage to the SCR catalytic converter, the conversion of $NO_x$ at a small $NO_2/NO_x$ ratio is a good indicator for the ageing state of the SCR catalytic converter.

It is particularly helpful for a high proportion of nitrogen oxide ($NO_x$) to be attained in the exhaust gas by means of desorption of $NO_x$ from a $NO_x$ storage catalytic converter that is disposed upstream. A desorption peak, with which the method according to the invention is performed, can be generated in a simple manner by means of the regeneration of the $NO_x$ storage catalytic converter.

Provision is made in an embodiment of the method according to the invention for the proportion of nitrogen dioxide ($NO_2$) of the collectively desorbed $NO_x$ in the exhaust gas to be set by means of the selection of a lambda value $\lambda$. By suitably selecting the lambda value during the regeneration of the $NO_x$ storage catalytic converter, the ratio of $NO_2/NO_x$ can be varied during the desorption peak. Hence, particularly an air-fuel ratio ($\lambda$ value) which is a little greater than 1 likewise leads to a desorption, however with a considerably larger $NO_2$ proportion than a regeneration at $\lambda$ values <1. $\lambda$ values <1 are particularly advantageous for the diagnosis of the SCR catalytic converter because as previously described the conversion capacity of said SCR catalytic converter reacts particularly sensitively if a small proportion of $NO_2$ and little oxygen are present in the exhaust gas that has been supplied.

It is also particularly helpful for the proportion of nitrogen oxide in the exhaust gas to be determined before entering the SCR catalytic converter. In so doing, the quantity of desorbed $NO_x$ from the regeneration of the $NO_x$ storage catalytic converter can be directly measured.

If the proportion of nitrogen oxide in the exhaust gas which has exited the SCR catalytic converter is then likewise determined, the ageing state of the SCR catalytic converter can then be directly suggested from the comparison of the two values. According to the invention, it is further proposed that a threshold value be predefined for the proportion of nitrogen oxide $NO_x$ in the exhaust gas which has exited the SCR catalytic converter. Such a threshold value can, for example, be deposited in the open-loop and closed-loop control device of the internal combustion engine. If a determination of the proportion of nitrogen oxide in the exhaust gas which has exited said SCR catalytic converter results in the predefined value being exceeded, an error message is transmitted or a warning lamp is activated.

It is further advantageous if the method is used at low exhaust gas temperatures. At low exhaust gas temperatures (<300° C.), the nitrogen oxide stored in the $NO_x$ storage catalytic converter is indeed desorbed is however not oxidized to $NO_2$ so that a small $NO_2/NO_x$ ratio is attained in the exhaust gas, whereat the $NO_x$ conversion of the SCR catalytic converter is especially sensitive. In addition, this effect is reinforced by the fact that the exhaust gas composition has a larger influence on the $NO_x$ conversion at temperatures from 180 to 250° C. in the SCR catalytic converter as is the case at higher temperatures. The use of the method according to the invention is therefore particularly advantageous when cold starting the internal combustion engine.

The invention further proposes that a catalytically coated, oxidizing exhaust gas after-treatment component is diagnosed with the method according to the invention. For that purpose, a $NO_x$ desorption peak, which has a large $NO_2/NO_x$ ratio and thereby determines the $NO_x$ conversion of the SCR catalytic converter, is initially generated, as previously described, with a first $\lambda$ value >1. In the second step, a $NO_x$ desorption peak having a smaller $NO_2/NO_x$ ratio is generated with a second $\lambda$ value <the first $\lambda$ value and thereby determines anew the $NO_x$ conversion of the SCR catalytic converter. In so doing, the second $\lambda$ value is smaller than the first $\lambda$ value.

If the two $NO_x$ conversions of the SCR catalytic converter determined by the $NO_2/NO_x$ ratios, which vary in size, are approximately equal, it can thereby be suggested that the oxidizing coating of the upstream exhaust gas after-treatment component has converted the nitrogen oxide to $NO_2$ and is therefore still able to sufficiently produce a favorable $NO_2/NO_x$ ratio. Otherwise it can be concluded therefrom that the oxidizing coating of the upstream exhaust gas after-treatment component has converted the nitrogen oxide to $NO_2$ only to a minor extent.

BRIEF DESCRIPTION OF THE DRAWINGS

Exemplary embodiments of the invention are explained below with reference to the drawings. In the drawings:

FIG. 2 shows a time chart of the $NO_x$ sensor signals during a regeneration phase of a $NO_x$ storage catalytic converter;

DETAILED DESCRIPTION

Figure 1:
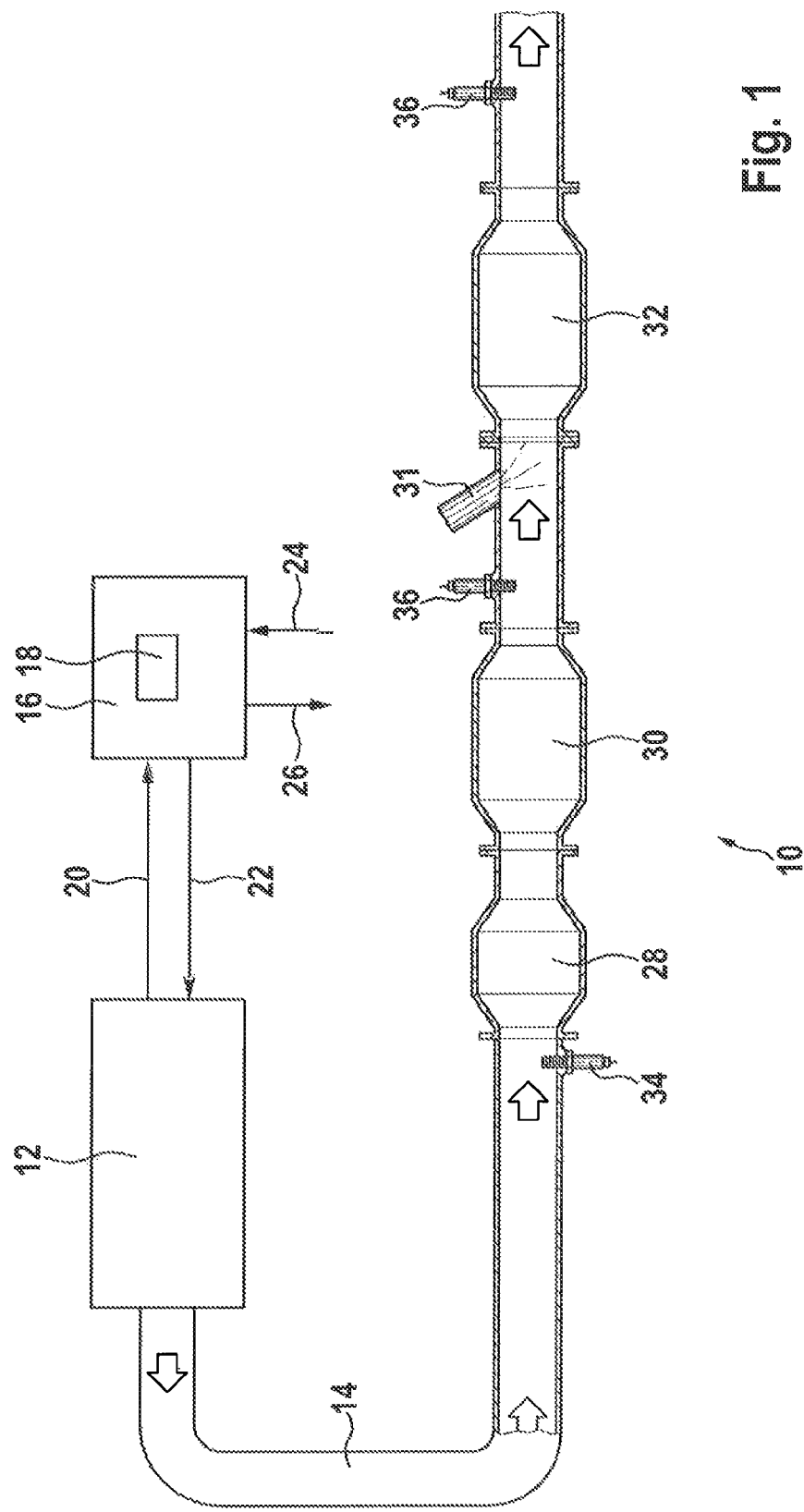
FIG. 1 shows a schematic view of an internal combustion engine and an exhaust system.

The same reference numerals are used for functionally equivalent elements and characteristic values in all figures even in the case of different embodiments.

FIG. 1 shows a simplified schematic view of an exhaust system 10 of a motor vehicle in the lower section of the drawing. An internal combustion engine 12, which channels exhaust gas into the exhaust system 10 via a pipe connection 14, is symbolically depicted above the exhaust system 10. An open-loop and/or closed-loop control device 16 comprising a computer program 18 executed therein is connected to the internal combustion engine 12 via incoming and outgoing control cables 20 and 22 and to components of the exhaust system 10 via incoming and outgoing control cables 24 and 26. The connections are merely indicated in the drawing and not depicted in detail.

The exhaust gas is guided and treated in the exhaust system 10 substantially from left to right. The present case relates to the exhaust system 10 of a diesel motor vehicle. Said exhaust system 10 comprises in the direction of flow of the exhaust gas a $NO_x$ storage catalytic converter 28, a catalytically coated, oxidizing exhaust gas after-treatment component 30, for example a diesel particle filter, a delivery device 31 for urea based additives and an SCR catalytic converter 32. In the exhaust gas stream, a $NO_x$ sensor is disposed in each case upstream and downstream of the SCR catalytic converter 32.

The $NO_x$ sensors 36 are electrically connected to the open-loop and/or closed-loop control device 16 via the incoming and the outgoing cables 24 and 26. These connections are however not individually depicted in the drawing pursuant to FIG. 1. The lambda probe 34 acquires the oxygen concentration in the exhaust gas during operation of the internal combustion engine 12. The $NO_x$ sensors 36 acquire a $NO_x$ proportion (nitrogen oxide proportion) in the exhaust gas in each case upstream and downstream of the SCR catalytic converter 32 and are therefore suited to monitor the functional capability of said SCR catalytic converter 32 and particularly to determine a so-called SCR conversion. A reducing agent (ammonia) can be introduced into the exhaust gas via the delivery device 31. The term "SCR conversion" is also subsequently referred to in short as "conversion".

It goes without saying that FIG. 1 is only an example and that the method according to the invention is not limited to diesel engines but can also be used with Otto engines and other comparable internal combustion engines 12 or rather with the exhaust systems 10 thereof.

FIG. 2 shows a temporal profile of the $NO_x$ sensor signals. The regeneration of the $NO_x$ storage catalytic converter 28 initially starts at a point in time t1. A $NO_x$ concentration, which is depicted by a curve 38, increases sharply on account of desorption of the stored $NO_x$. Because said $NO_x$ storage catalytic converter 28 is still cold and the oxygen concentration in the exhaust gas is small ($\lambda<1$), the desorbed $NO_x$ does not oxidize to $NO_2$. Moreover, no significant oxidation of $NO_x$ to $NO_2$ takes place in the upstream catalytically coated, oxidizing exhaust gas after-treatment component 30 due to the low exhaust gas temperatures, as they exist when cold starting the engine or in overrun conditions. The $NO_x$ sensor 36 upstream of the SCR catalytic converter 32 therefore delivers output signals as shown in a first curve 40. A second curve 42 depicts an output signal of the $NO_x$ sensor downstream of said SCR catalytic converter 32. In this connection, a solid line represents the signal in the case of an intact SCR catalytic converter 32 whereas a dashed line reflects the signal for an aged SCR catalytic converter 32. The output signals are thereby proportional to the $NO_x$ concentration in the exhaust gas. Because an intact SCR catalytic converter 32 still achieves a certain amount of conversion even when an unfavorable $NO_2/NO_x$ ratio prevails, the solid line curve 42 has a significantly flatter profile. A direct measurement of the conversion during such a desorption peak therefore represents a suitable method for diagnosing the ageing state of an SCR catalytic converter 32.

In is also conceivable for a threshold value x to be deposited in the open-loop and/or closed-loop control device 16, an error message being outputted if said threshold value x has been exceeded.

The invention claimed is:

1. A method for operating an exhaust system of an internal combustion engine, the method comprising
   reducing oxide ($NO_x$) by a SCR catalytic converter; and
   monitoring, by a control device, an ageing state of the SCR catalytic converter,
      wherein, during a temporally limited phase having a ratio of nitrogen dioxide to nitrogen oxide less than one in an exhaust gas, a conversion of the SCR catalytic converter is acquired and evaluated and the ageing state of the SCR catalytic converter is determined therefrom,
      wherein the functional capability of a catalytically coated, oxidizing exhaust gas after-treatment component is diagnosed, and
      wherein a first $NO_x$ desorption peak, which has a large $NO_2/NO_x$ ratio, is generated with a first lambda value >1 and the conversion of the SCR catalytic converter is determined therewith, in that a $NO_x$ desorption peak having a smaller $NO_2/NO_x$ ratio is generated with a second lambda value and the conversion of said SCR catalytic converter is determined therewith, in that the two conversions of said SCR catalytic converter ascertained using $NO_2/NO_x$ ratios which vary in size are compared and in that the functional capability of the oxidizing coating of the upstream exhaust gas after-treatment component is recognized/detected by means of the evaluation of the conversions of the SCR catalytic converter.

2. The method according to claim 1, wherein a high proportion of nitrogen oxide (NOx) is attained by desorption of NOx from a NOx storage catalytic converter that is disposed upstream of the SCR catalytic converter.

3. The method according to claim 1, wherein a proportion of nitrogen dioxide ($NO_2$) in the exhaust gas is set by adjusting a lambda value of the fuel-air mixture.

4. The method according to claim 1, wherein a proportion of nitrogen oxide in the exhaust gas is determined before entry into the SCR catalytic converter.

5. The method according to claim 1, wherein a proportion of nitrogen oxide in the exhaust gas is determined after exiting the SCR catalytic converter.

6. The method according to claim 1, wherein a threshold value for the proportion of nitrogen oxide in the exhaust gas after exiting the SCR catalytic converter is predefined.

7. The method according to claim 1, wherein said method is used at low exhaust gas temperatures.

8. The method according to claim 1, wherein said method is used at exhaust gas temperatures below 300° C.

9. A computer program which, when run on a data processing device causes the data processing device to
   reduce nitrogen oxide ($NO_x$) the use of a SCR catalytic converter; and
   monitor the SCR catalytic converter,
      wherein, during a temporally limited phase having a ratio of nitrogen dioxide to nitrogen oxide less than one in an exhaust gas, a conversion of the SCR catalytic converter is acquired and evaluated and an ageing state of the SCR catalytic converter is determined therefrom,
      wherein the functional capability of a catalytically coated, oxidizing exhaust gas after-treatment component is diagnosed,
   wherein a first $NO_x$ desorption peak, which has a large $NO_2/NO_x$ ratio, is generated with a first lambda value >1 and the conversion of the SCR catalytic converter is determined therewith, in that a $NO_x$ desorption peak having a smaller $NO_2/NO_x$ ratio is generated with a second lambda value and the conversion of said SCR catalytic converter is determined therewith, in that the two conversions of said SCR catalytic converter ascertained using $NO_2/NO_x$ ratios which vary in size are compared and in that the functional capability of the oxidizing coating of the upstream exhaust gas after-treatment component is recognized/detected by means of the evaluation of the conversions of the SCR catalytic converter.

10. An open-loop and/or closed-loop control device for an internal combustion engine, said control device being programmed to
reduce nitrogen oxide ($NO_x$) by the use of a SCR catalytic converter; and
monitor the SCR catalytic converter,
wherein, during a temporally limited phase having a ratio of nitrogen dioxide to nitrogen oxide less than one in an exhaust gas, a conversion of the SCR catalytic converter is acquired and evaluated and an ageing state of the SCR catalytic converter is determined therefrom,
wherein the functional capability of a catalytically coated, oxidizing exhaust gas after-treatment component is diagnosed,
wherein a first $NO_x$ desorption peak, which has a large $NO_2/NO_x$ ratio, is generated with a first lambda value >1 and the conversion of the SCR catalytic converter is determined therewith, in that a $NO_x$ desorption peak having a smaller $NO_2/NO_x$ ratio is generated with a second lambda value and the conversion of said SCR catalytic converter is determined therewith, in that the two conversions of said SCR catalytic converter ascertained using $NO_2/NO_x$ ratios which vary in size are compared and in that the functional capability of the oxidizing coating of the upstream exhaust gas after-treatment component is recognized/detected by means of the evaluation of the conversions of the SCR catalytic converter.

* * * * *